United States Patent

McCord

[11] Patent Number: 5,980,050
[45] Date of Patent: Nov. 9, 1999

[54] VEHICLE MIRRORS HAVING CONVEX CURVATURES AND METHODS OF MAKING SAME

[75] Inventor: Robert C. McCord, Romulus, Mich.

[73] Assignee: Multivex Mirror Company

[21] Appl. No.: 08/849,260

[22] PCT Filed: Nov. 30, 1995

[86] PCT No.: PCT/US95/15561

§ 371 Date: Jun. 2, 1997

§ 102(e) Date: Jun. 2, 1997

[87] PCT Pub. No.: WO96/16839

PCT Pub. Date: Jun. 6, 1996

[51] Int. Cl.[6] .................................................. G02B 5/10
[52] U.S. Cl. ............................................................. 359/868
[58] Field of Search ................................... 359/864, 868, 359/869, 871, 866; 248/475.1, 479

[56] References Cited

U.S. PATENT DOCUMENTS

| | | | |
|---|---|---|---|
| 4,449,786 | 5/1984 | McCord | 359/868 |
| 4,580,881 | 4/1986 | Kim | 359/868 |
| 4,730,914 | 3/1988 | Stout | 359/868 |
| 5,096,281 | 3/1992 | Windebank et al. | 359/868 |

*Primary Examiner*—Cassandra Spyrou
*Assistant Examiner*—Mark A. Robinson
*Attorney, Agent, or Firm*—Brooks & Kushman P.C.

[57] ABSTRACT

A vehicle mirror, and a mold for making same, each includes a portion of the viewing surface wherein the field angle increases at an increasing rate as the observer's eye travels outward across the mirror, and another portion wherein the field angle increases at a decreasing rate as the observer's eye travels across the mirror surface. In one embodiment, the mirror includes a primary viewing area (16) nearest to the observer (14) having a spherical convex surface, a secondary viewing area (18) somewhat farther from the observer, having an aspherical convex surface wherein the field angle increases at an increasing rate, and a tertiary viewing area (20) still farther outward, having an aspherical convex curvature wherein the field angle increases at a decreasing rate.

13 Claims, 7 Drawing Sheets

VEHICLE MIRRORS HAVING CONVEX CURVATURES AND METHODS OF MAKING SAME

TECHNICAL FIELD

This invention relates to vehicle mirrors having complex curvature as well as a computer implemented method of designing the same.

BACKGROUND ART

Automotive vehicles often employ mirrors including a convex surface which is designed to provide a compromise between several design objectives. These objectives typically include a field of view, mirror size and location, apparent image size, and distortion.

My U.S. Pat. No. 4,449,786 discloses a mirror having a convex curvature defined by mathematical and geometrical relationships between the position of the observer, the viewed objects, and the mirror. The design criteria which I disclose in my '786 patent yield mirror surfaces which control bi-ocular distortions while producing the desired field of view. My patented design provides an improved mirror surface which typically includes a relatively flat, spherical-convex primary viewing area combined with a peripheral, aspherical-convex viewing area employing a continuously decreasing radius of curvature (and, generally a continuously increasing field angle) as the surface extended outwardly from the central or primary viewing area of the mirror. This concept is currently successfully employed on about 50,000 light-truck vehicles in North America. While my patented design defines a surface having a smooth optical transition between the primary viewing area and the more radically curved aspherical peripheral area, the design objectives for some mirrors often present problems to the mirror optics designer and/or manufacturer.

For example, on mirrors with relatively limited width and/or large field-of-view requirements, a relatively greater portion of the mirror profile must be provided with an aspherical convex surface to obtain the desired field of view from the mirror. This often results in rapidly decreasing radii of curvature of the mirror's surface at the periphery of the mirror, as well as at the periphery of the corresponding mold surface. While often necessary to obtain the desired view angle, this rapidly increasing curvature in the peripheral area provide increased and unwanted distortion of reflected images in that area.

Another problem arises in the manufacture of mirrors having a relatively small or rapidly decreasing radii of curvature at their periphery. The glass for these mirrors is typically formed on glass bending equipment which heats the mirror glass to its softening point, and bends the softened glass, either by the force of gravity over a mold, or by press-forming the glass sheet between two complementary molds. In mirrors having designs which include relatively rapidly decreasing radii of curvature at their periphery, the sharp curvature of the glass at the periphery may prove difficult to form on existing glass bending equipment without heating the glass to a higher temperature in the areas of sharper curvature and/or other more expensive and time-consuming forming methods and equipment. As is appreciated by those skilled in the art, heating glass to an increased temperature to form relatively sharp bends in a glass often negatively affects the surface quality of the glass, thereby yielding mirror lenses of low or unacceptable quality. This problem is exacerbated by the fact that the mold surface is necessarily larger than the finished mirror, often resulting in a forming surface which, at its periphery, has a more severe curvature than the smaller finished mirror formed thereon.

One object of the present invention is, therefore, to provide an improved vehicle mirror design which balances the considerations of limited viewing surface with wide field of view while simultaneously minimizing both (1) the image distortion caused at the transition points between changing viewing surface profiles and (2) the image distortion resulting from relatively rapidly decreasing radii of curvature at the periphery of the mirror.

Another object of the present invention is to provide an improved method for designing a vehicle mirror surface which yields a controlled image distortion and a wide field of view while minimizing the amount of image distortion at the periphery of the mirror.

It is yet another object of the present invention to provide a method of designing a mold surface for fabricating a vehicle mirror which provides a resultant mirror having a surface which provides both controlled image distortion and a wide field of view while minimizing the sharpness of bend required in the mold surface at and nominally beyond the periphery of the mirror.

DISCLOSURE OF INVENTION

In carrying out the above and other objects, the mirror of this invention includes a portion of the viewing surface having a surface wherein the field angle increases at an increasing rate as the observer's eye travels outward across the mirror, and another portion of the viewing surface with a curvature defining a field angle which is increasing at a decreasing rate as the observer's eye travels across the surface.

In one embodiment, the mirror includes a primary viewing area nearest the observer having a spherical convex surface; a secondary viewing area adjacent the primary viewing area and somewhat farther from the observer than the primary surface, the secondary surface having an aspherical convex surface wherein the field angle increases at a constant or increasing rate; and a tertiary viewing area adjacent the secondary viewing area and farther outward from the secondary area, wherein the tertiary viewing area employs an aspherical convex curvature having a field angle which increases at a decreasing rate towards the outward edge of the mirror and of the corresponding mold.

As used herein "spherical convex surface" means a surface with a constant or infinite radius. Thus, as used herein "spherical convex" surfaces are meant to refer to and include flat surfaces.

Also according to the present invention, a computer system and method are provided for designing a mirror surface according to desired field of view, mirror size, mirror location, and mirror molding design criteria which employs mathematical and geometrical relationships between the position of the observer, the viewed objects, and the mirror to develop a mirror surface including a viewing area in which the field angle increases in a controlled fashion at a constant or increasing rate of change, and an adjacent viewing area wherein the field angle increases in a controlled fashion at a decreasing rate of change as the surface extends outwardly on the mirror.

In the preferred mirror and method of designing the same, the mirror has a transition between each of the different viewing areas in which the instantaneous radii of curvature of the two areas at their transition point are substantially equal to one another to minimize distortions caused by the observer's bi-ocular vision, and to generate a smooth image size change through the transition points.

In the preferred embodiment of the mirror and method of making the same, viewing areas are described having: spherical convex surfaces; aspherical convex surfaces with the field angles increasing at a controlled, constant or increasing rate; and aspherical convex surfaces with the field angle increasing at a controlled, constant or decreasing rate. These surfaces are combined to balance the competing design objectives of obtaining a desired wide field of view while at the same time minimizing distortion caused both (1) at the transition points between viewing areas and (2) at the periphery of the mirror and mold extension area.

The system and method of the present invention is also capable of generating the data necessary to define the desired surface of the molds which will be utilized to form the mirror into the design shape.

Still other objects and advantages of the invention will become readily apparent from the following detailed description of the best mode for carrying out the invention when taken in connection with the accompanying drawings.

BEST MODE FOR CARRYING OUT THE INVENTION

Figure 1:
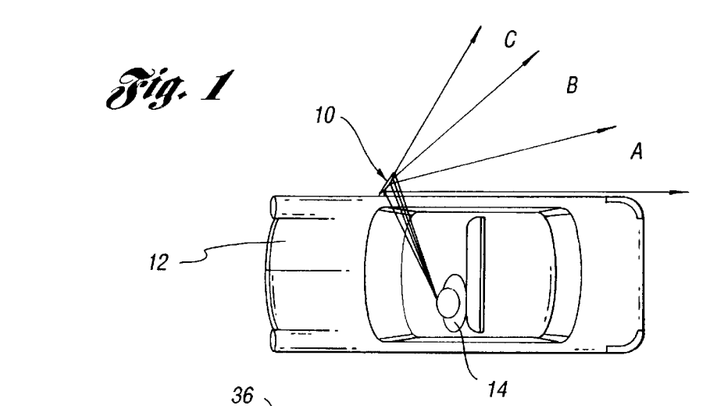
FIG. 1 is a schematic plan view of an observer in an automotive vehicle illustrating the field of view of a side view mirror representing the preferred embodiment of the invention.
Figure 2:
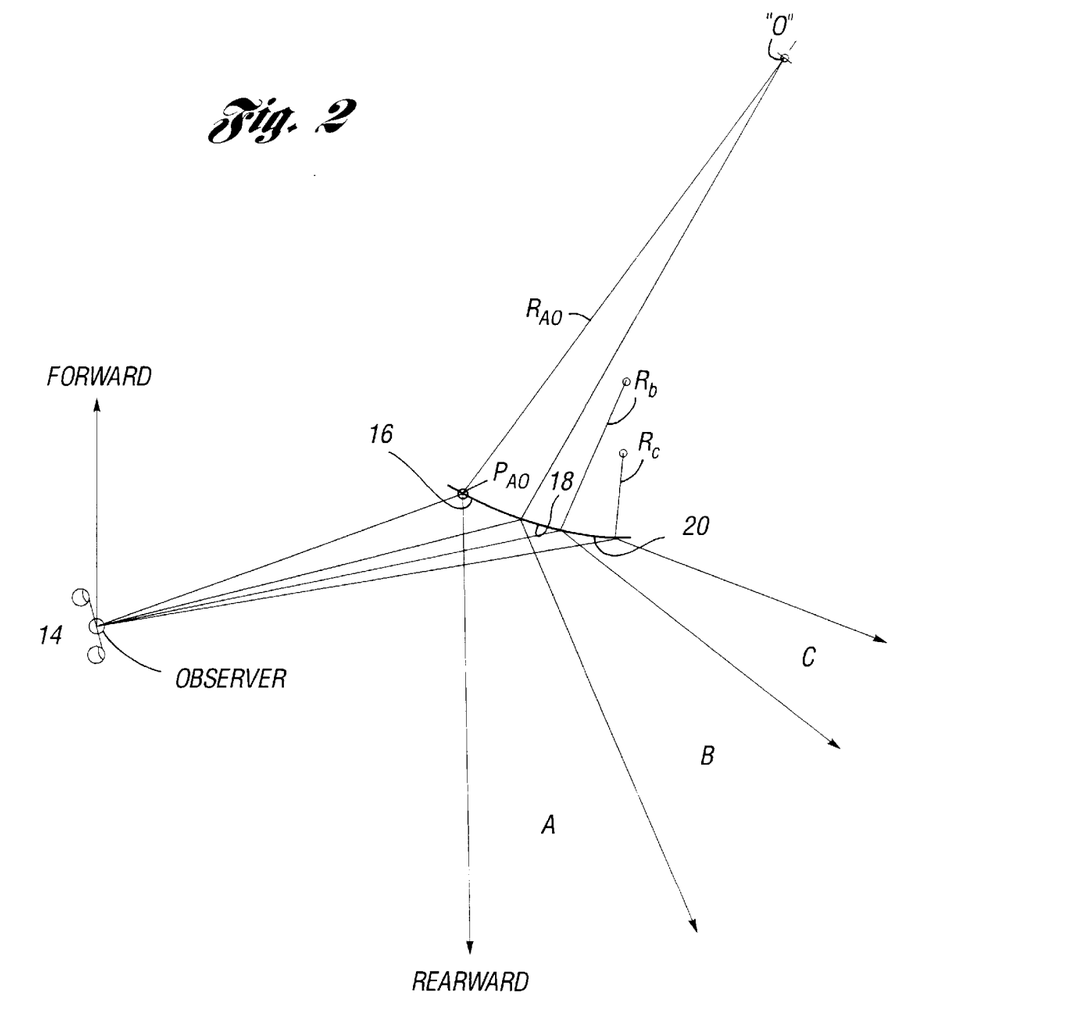
FIG. 2 shows the geometries associated with a side view mirror employing primary, secondary, and tertiary viewing areas derived according to the present invention.

Referring to FIGS. 1 and 2, one embodiment of the mirror of the present invention, indicated as 10, is a passenger side view mirror for a vehicle 12. The mirror 10 may be mounted in the conventional position adjacent the passenger side window of the vehicle 12. The mirror 10 includes a primary viewing area 16, the surface of which is typically a spherically convex curve which allows an observer 14 to view the image of objects in sector A. Again, it should be noted that this spherically convex curved portion may have an infinite radius of curvature (i.e., it may be flat). Additionally, this surface may be a constant radius cylinder or cone.

A secondary viewing area 18 is located outwardly from the observer along the mirror surface from the observer 14.

The secondary viewing area, which allows the observer to view images in sector P, preferably provides a surface having an aspherically convex curvature in which the incremental field angle is increasing at a constant rate, or at an increasing rate, as the surface extends outwardly from the observer. This surface is preferably developed according to my invention as disclosed in U.S. Pat. No. 4,449,786.

The mirror 10 also includes a tertiary viewing area 20 having an aspherically convex surface wherein the incremental field angle is increasing at a constant rate, or at a decreasing rate, of change to provide the observer 14 with a view of images of objects in sector C. By providing a peripheral viewing area wherein the surface, though convex, provides constant or decreasing rate of incremental field angles increase, a less abrupt curvature at the periphery is developed, thereby reducing the distortion that would otherwise result if the secondary viewing area were extended to the periphery of the mirror.

It should be appreciated that, though the specific embodiment of FIGS. 1 and 2 includes a mirror surface having the above-described primary, secondary, and tertiary viewing areas, the present invention contemplates any mirror surface design which includes at least two viewing areas wherein at least one of the viewing areas has the surface characteristics of the tertiary viewing area 20 of the embodiment of FIGS. 1 and 2. Thus, for example, one or more portions of a particular mirror including the surface characteristics of the above-described tertiary viewing area 20 might be defined at the periphery of the mirror along the edge of the mirror relatively closer to the observer, at the upper edge of the mirror, at the lower edge of the mirror, and/or at the outer edge of the mirror. The size, number, and location of surfaces of the type shown as viewing area 20 depends upon the location of the mirror, the size of the mirror, and the desired field of view. These viewing areas may be combined with various other viewing areas having spherical convex or aspherical convex surfaces to obtain the desired field of view with controlled optical distortion and controlled image size in selected areas of the mirror.

It should also be noted that, while the embodiment of FIGS. 1 and 2 and the detailed diagrammatic examples in this application illustrate a methodology for developing "Y" values corresponding to "X" values for developing a curvature about a point or vertical axis, the method of the present invention may be employed to alternatively or simultaneously develop viewing areas including the surface characteristics described herein to expand the field of view in any direction. Thus, for example, large truck or bus mirrors designed according to my invention may include viewing areas which provide a viewing angle which allows the observer an expanded vertical field of view to include the ground at the front, side or back of the vehicle, without providing distorted or unnecessarily large or small images in other viewing areas on the mirror.

Figure 3:
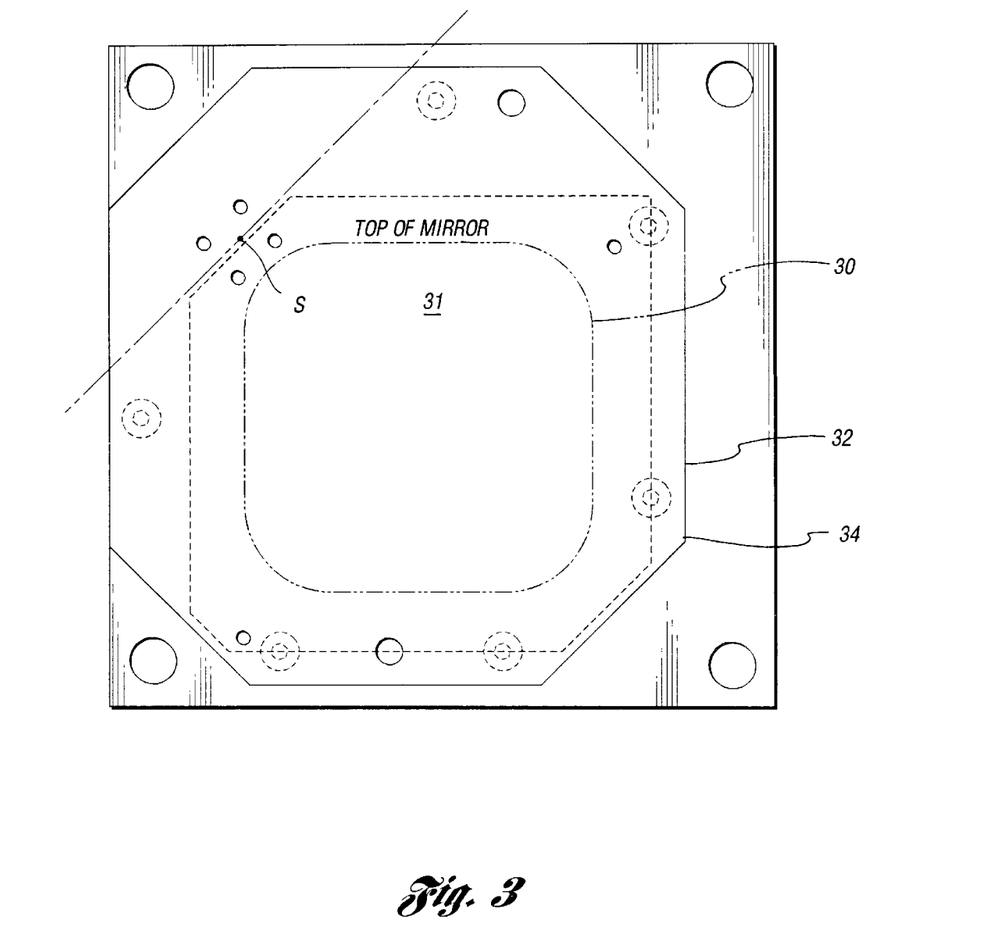
FIG. 3 is a top view of a mold surface which may be utilized to form a mirror of the type shown in FIG. 1.
Figure 4:
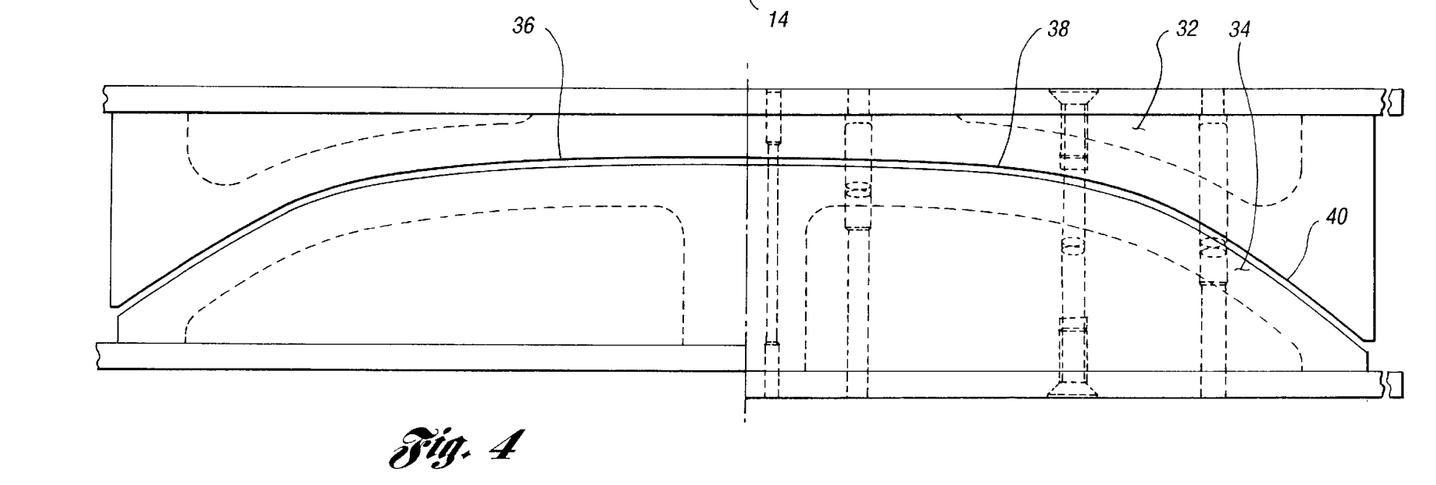
FIG. 4 is a center-line cross-section side view of the mold of FIG. 2.

FIGS. 3 and 4 illustrate top and side cross-section views, respectively, of glass forming molds which may be employed to mold the mirror 10 of the present invention. Conventional glass sheet bending mold techniques and tooling are utilized to fabricate the mirrors. These techniques may include press forming suitably heated glass sheet blanks 30 between upper and lower molds 32 and 34 to form the glass sheet to the desired surface profile. For side view mirrors, or other mirrors which might be utilized in pairs and mounted on either side of a vehicle, the molds 32 and 34 may be designed with surfaces which, for example, form the desired surface profile for the driver's side view mirror on one side of the mold (at 36), and the surface profile for the associated passenger side view mirror (at 38) for a particular vehicle. Alternatively, separate molds could be designed which, for example, mold pairs of identical passenger side view mirrors for a particular vehicle, with a separate set of molds having surface profiles which provide for simultaneously forming two driver side mirrors.

Other conventional glass sheet molding techniques and tooling may also be utilized, such as, for example, gravity-sag or vacuum-assist bending systems. These systems may utilize a single mold surface rather than matching upper and lower molds 32 and 34. Again, however, the method of the present invention may be used to design the desired surface profile for the mold without departing from the spirit of the invention.

As previously described, one problem associated with forming mirrors having an aspherically convex surface portion at their periphery is that, for some mirror widths, surfaces yielding desired field angles have relatively rapidly decreasing radii of curvature (i.e., rapidly increasing incremental field angles) at their periphery, resulting in relatively sharp bends. This problem is typically exacerbated because the desired mirror surface profile is extended outwardly from the dimensions of the finished mirror 31 to define the mold surface for the mirror blank 30 which is typically larger in size. A mirror design incorporating the above-described tertiary viewing area provides a much gentler curvature at the periphery of the mirror and over the extended surface of the mirror blank. Thus, this improved design not only reduces image distortion and improves mirror optics, it provides a surface profile which is easier to fabricate on existing glass sheet forming equipment.

Figure 5:
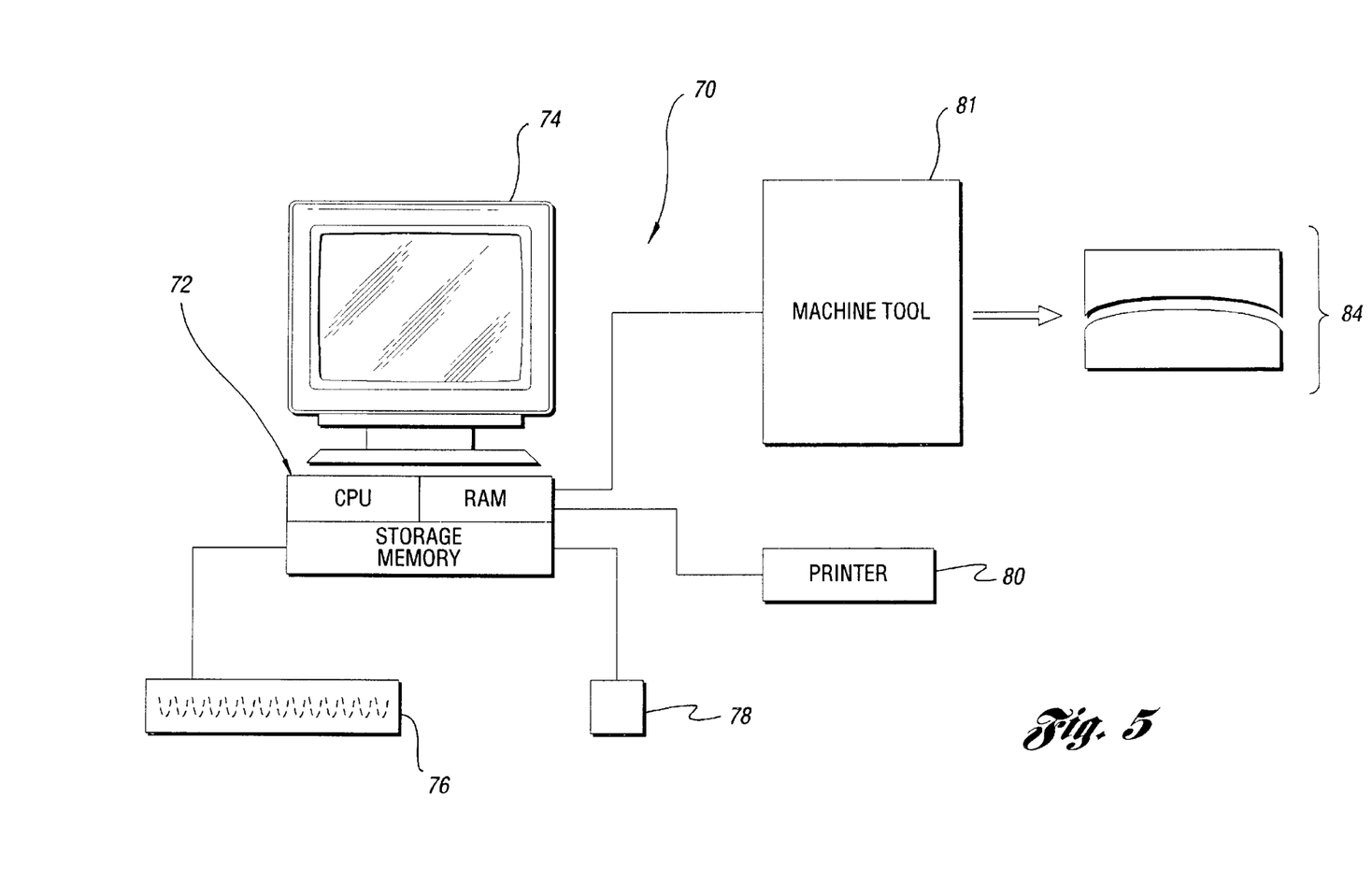
FIG. 5 is a block diagram of the mirror design and mold surface fabricating system of the present invention.

Referring to FIG. 5, the system and method for developing the above-described vehicle mirror surface is preferably performed on a suitably programmed computer. The mirror surface design system, generally indicated as 70, includes a computer, such as a conventional desktop model having a processor (CPU), random access memory (RAM), and storage memory, which is suitably programmed to perform the method described herein. The computer typically also includes a CRT display 74 and data input means, such as a keyboard 76, and/or mouse 78. A conventional serial or parallel printer 80 may also be suitably connected to the computer 72 to obtain printouts of surface design data developed by the system 70.

It should be noted that the system 70 may also be configured to develop the data in any format that is acceptable to a conventional machine tool control to drive the machine tool 82 to machine the surface of the molds utilized to form the mirrors. Thus, for example, the system might develop machine-readable data recorded on suitable recording media which is transported from a desktop computer to a machine tool control, where the recorded data is then read by the machine tool control to drive the tool.

Alternatively, the surface data may be generated in a print-out in man-readable form for manual input to the appropriate machine tool control. Another alternative configuration might include direct communication means between the computer that is used to develop the surface design and the tool or tools that are utilized to machine the mold surface.

Another contemplated embodiment includes the integration of a conventional computer-aided design (CAD) system to which the developed mirror or mold surface data may be input to allow the operator to view a CAD rendering of the developed surface or to project specific fields-of-view and other technical data relative thereto as produced by the mirror's surface.

The geometry necessary to develop the spherical convex primary viewing area 16 is well known. The data describing the surface for this portion of the mirror can be generated using independent software or can be integrated with the present invention. In one embodiment, a conventional IBM PC compatible computer having a 486 DX2 microprocessor, 32 megabytes of RAM, and 360 megabytes of storage memory on a fixed disc drive is utilized. As described hereinafter, a Fortran program iteratively calculates the resultant coordinate values and other technical and analytical data for a mirror surface having the desired field of view, based upon initial preselected parameters. Utilizing these initial preselected parameters, the program incrementally develops the surface profile, and determines the resulting surface coordinates. In one embodiment, surface coordinates define a curve which is then revolved around a focal axis to define the mirror surface. Alternatively, the surface profile may be extended along a linear border. Various other ways to utilize one or more profile curves to generate the mirror surface are disclosed in my U.S. Pat. No. 4,449,786, which is incorporated herein. As will be appreciated by those skilled in the art, the mirror geometry and, therefore, the manner of implementation of the curvature (S) developed by the present invention, are dictated by several factors, including the mirror size, mounting location, and desired horizontal and/or vertical fields of view.

The basic geometry necessary to develop the secondary viewing area 18 described herein is described in detail in my U.S. Pat. No. 4,449,786. However, a definition of the symbols and structure, including a description for developing a surface for the tertiary viewing area is set forth below. It should be noted that several conventions have been adopted in this application to enhance the illustration and for the sake of clarity. First, points in a particular section of the mirror include a letter corresponding to that section in their subscript. For example, a point in sector A (the primary viewing area) of the mirror surface will be designated $P_{An}$, a point in sector B (the secondary viewing area) of the mirror surface will be denoted $P_{Bn}$, and a point in sector C (the tertiary viewing area) of the mirror surface will be denoted $P_{Cn}$, Similarly, angles and distances in the Figures may also include this alpha subscript to indicate their relationship to a particular section of the mirror 30 surface. Also, the first point in a particular section includes the subscript "0". Thus, the initial point in section A is $P_{A0}$, in section B, $P_{B0}$, and in section C, $P_{C0}$. "n" is used as a subscript to indicate any point, as opposed to a particular point. "N" is used as a subscript to indicate the end point in a particular sector or of the entire viewing surface. For example, $P_{AN}$ is the last point in sector A of the viewing surface, $P_{BN}$ is the last point in sector B of the viewing surface, and $P_{CN}$ is the last point in sector C of the viewing surface. It should be noted that several points have multiple labels. For example, $P_{AN}$ is also known as $P_{B0}$, since it is the end point in section A of the viewing surface as well as a beginning point in sector B of the viewing surface. Likewise, $P_{CN}$ is the same point as $P_{TN}$, since $P_{CN}$ is the end point on sector C of the viewing surface and it is also the end point of the entire viewing surface.

Of course, while a limited number of points have been illustrated to make the Figures readable, it will be appreciated that these illustrations are necessarily a simplification of the iterative process of generating a mirror surface according to the present invention, which process necessarily entails consideration of hundreds of points, and associated distances and angular relationships, along the mirror surface.

Figure 6:
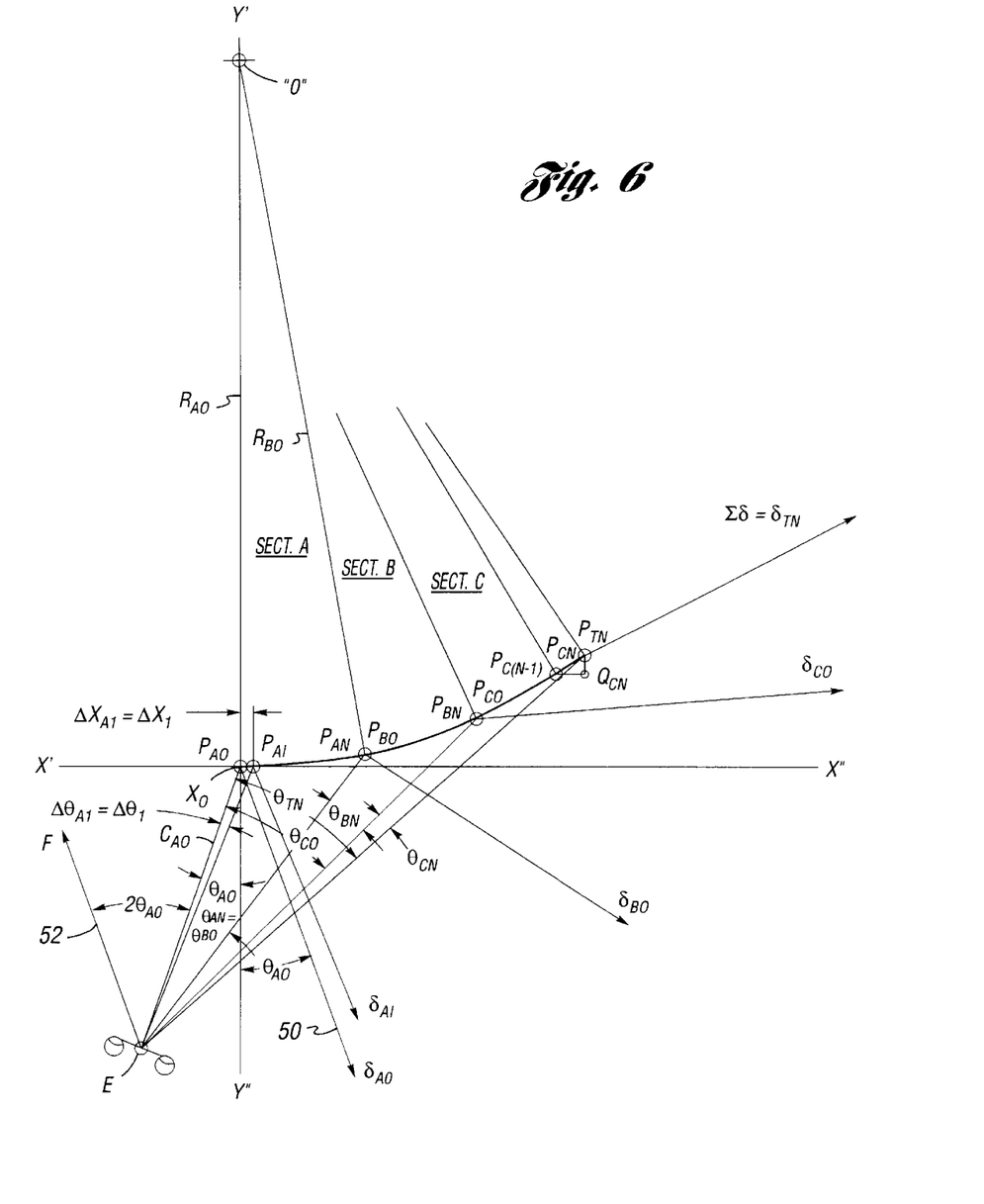
FIG. 6 is a diagram illustrating the basic geometric relationships between the observer, the mirror, the direction of observation and reflection, and field of view developed by the mirror relative to the observer.

Referring to FIG. 6, the mirror surface is defined by a set of planar coordinates $(x_n, y_n)$. The line (X'–X") is the "X"

axis, and is perpendicular to $R_{A0}$ at $P_{A0}$. The line (Y'–Y") is the "Y" axis, and is coincident with $R_{A0}$.

Points $P_{A0}$, $P_{A1}$, $P_{A2}$, ... $P_{An-1}$, $P_{AN}$ are points on the primary viewing area, A, of the mirror's surface. Line $R_{A0}$ is the instantaneous radius of curvature at point $P_{A0}$, and is a measure of instantaneous radius of curvature of the primary viewing area 16 of the mirror, which extends from point $P_{A0}$ to $P_{AN}$. The transition between the primary viewing surface and the secondary viewing surface occurs at point $P_{AN}$ (also known as $P_{B0}$) Points $P_{B0}$, $P_{B1}$, $P_{B2}$, ... $PB_{n-1}$, $P_{BN}$ are points on the secondary viewing area, B, of the mirror surface. Points $P_{C0}$, $P_{C1}$, $PC_2$, ... $PC_{n-1}$, $P_{CN}$ are points on the secondary viewing area, C, of the mirror surface. The focal center, design center and manufacturing center of the mirror is $P_{A0}$. $R_{A0}$ is the axis of rotation of the mirror geometry.

Again, the line (Y'–Y") is coincident with and is an extension of $R_{A0}$, from which "x" values are measured to the right. "y" values are measured from the "x" axis toward point "0" and parallel to $R_{A0}$. It should be noted that the diagram of FIG. 6 is for right-hand mirrors. For left-hand mirrors, the diagram is constructed opposite.

$R_n$ is the instantaneous radius of curvature at point $P_n$. In the primary viewing area $R_{A0}=R_{A1}=\ldots R_{B0}$ since the constant and/or spherical radius is inclusive of these points.

Point E is mid-way between the eyes of an observer, and is the design point of observation. Line 50 ($P_{A0}$, $\delta_{A0}$) is the reflected line of direct rearward sight, toward an object (not shown), as viewed by the observer from point E and reflected from the mirror surface at point $P_{A0}$. Line 52 is the direct forward vision line of sight. Lines 50 and 52 are parallel to each other. Point $P_{A0}$ identifies the optical design starting point for the mirror in this preferred embodiment, though it could occur at any other optional point.

For reflected light, the angle of incidence ($\delta_{A0}$, $P_{A0}$, Y") is equal to the angle of reflection (Y", $P_{A0}$, E), as measured from line ($P_{A0}$, Y"), which by construction is perpendicular to the instantaneous radius of curvature of the mirror at point $P_{A0}$. Said angles are designated as $\theta_{A0}$. Therefore, angle ($\delta_{A0}$, $P_{A0}$, E)=2$\theta_{A0}$, by addition. By further geometric principles, angle ($P_{A0}$, E, F)=2$\theta_{A0}$, as well. The foregoing facts establish the geometric relationships between the vehicle's attitude and the optical design geometry of the mirror.

Angle $P_{A0}$, E, $P_{AN}$)=$\theta_{AN}$ is the vision angle across the spherical primary viewing surface of the mirror. Angle ($P_{B0}$, E, $P_{BN}$)=($\theta_{C0}-\theta_{B0}$)=$\theta_{BN}$ is the vision angle across the aspherical secondary viewing surface of the mirror. Angle ($P_{C0}$, E $P_{CN}$)=$\theta_{TN}-\theta_{C0}=\theta_{CN}$, is the vision angle across the aspherical tertiary viewing surface of the mirror. In developing the viewing surface, a series of equal $\Delta\theta$ increments are generated for the purpose of establishing uniform vision angle elements. Therefore, by definition, ($\Delta\theta_{A1}=\Delta\theta_{A2}$), $\Delta\theta_{A3}$, ..., $\Delta\theta_{AN}$ are all equal vision angle differential increments. These equal $\Delta\theta$ vision angle increments subtend arc/chords ($P_{A0}$, $P_{A1}$), ($P_{A1}$, $P_{A2}$), ... ($P_{A(N-1)}$, $P_{AN}$); ($P_{B0}$, $P_{B1}$), ($P_{B1}$, $P_{B2}$), ... ($P_{B(N-1)}$, $P_{BN}$); ($P_{C0}$, $P_{C1}$), ($P_{C1}$, $P_{C2}$), ..., ($P_{C(N-1)}$, $P_{CN}$), respectively, along the mirror's convex curve ($P_{A0}$, $P_{TN}$). These subtended arc/chords are normally not equal. ($\Sigma\theta = \theta_{TN}$) is the total vision angle across mirror.

Again, the symbols $P_{AN}$, $P_{BN}$ and $P_{CN}$ denote the final point at the right edge of each viewing sector. Thus, $P_{BN}=P_{C0}$, the transition point between the secondary and tertiary viewing areas.

$R_n$ values are radii of curvature at respective points $P_n$. For the spherical (constant radius) primary surface only, the origin of all $R_n$ value is at point "0". At all other random points of interest, $P_n$, the origin of the respective Rn value does not lie at point "0" nor at any other point of defined interest.

The slope angle of instantaneous tangents to the mirror's curvature through point $P_n$, with respect to the (X) axis controls the angle of reflection of light rays incident thereupon; those reaching the observer at point E being of principal interest in this invention. $\phi_n$ is the angular displacement of Rn from the axis of rotation of the mirror $R_{A0}$. Also, because perpendicular lines form equal angles with respect of elements of other perpendicular lines, $\phi_n$ is also a measure of the slope angle of these instantaneous tangents. $\Delta\phi_n$ is the differential increment between $\phi_{(n-1)}$ and $\phi_n$.

$\gamma_n$ is a measure of the slope angle of the cord $D_n$ equal to ($P_{(n-1)}$, $P_n$), with respect to the (x—x) axis. As described hereinafter, the incremental x and y values for each point along the surface of the mirror can be calculated from the geometric relationships between these basic dimensions.

Finally, all $\delta$ and $\Delta$ values represent field angle components which this invention compares to respective constant $\Delta\theta$ values according to well-defined mathematical relationships of the invention. The $\Delta\theta$ increments are always taken equal to each other, while the $\Delta\delta$ increments are usually continuously increasing in value based upon the following formulas.

The basic relationships between $\theta$ and $\delta$ are:

$\Delta\delta_n=(\Delta\Theta+2\Delta\phi_n)$ is the incremental angular relationship;

$\delta_N=(\Theta_N+2\phi_N)$, is the field angle relationship;

$\delta_N$ ($\delta_0+\Delta\delta_1+\Delta\delta_2 \ldots +\Delta 67_N$), is another field angle relationship.

The geometry for those portions of the mirror which are not flat or spherical convex (identified herein as the secondary and tertiary viewing areas) is based on the basic principle that the ever-changing field angle differentials ($\Delta\delta_n$) are always derived in relationship to constant vision angle differentials ($\Delta\theta_1=\Delta\theta_2=\Delta\theta_n \ldots =\Delta\theta_N$).

$$\Delta\delta_n=\{\Delta\delta_{(n-1)}\} \{1+X\} \quad (1)$$

"X"s a constant value and is chosen by trial and error until all physical conditions for a particular application, including total field angle ($\Sigma\delta$) are satisfied.

Figure 7:
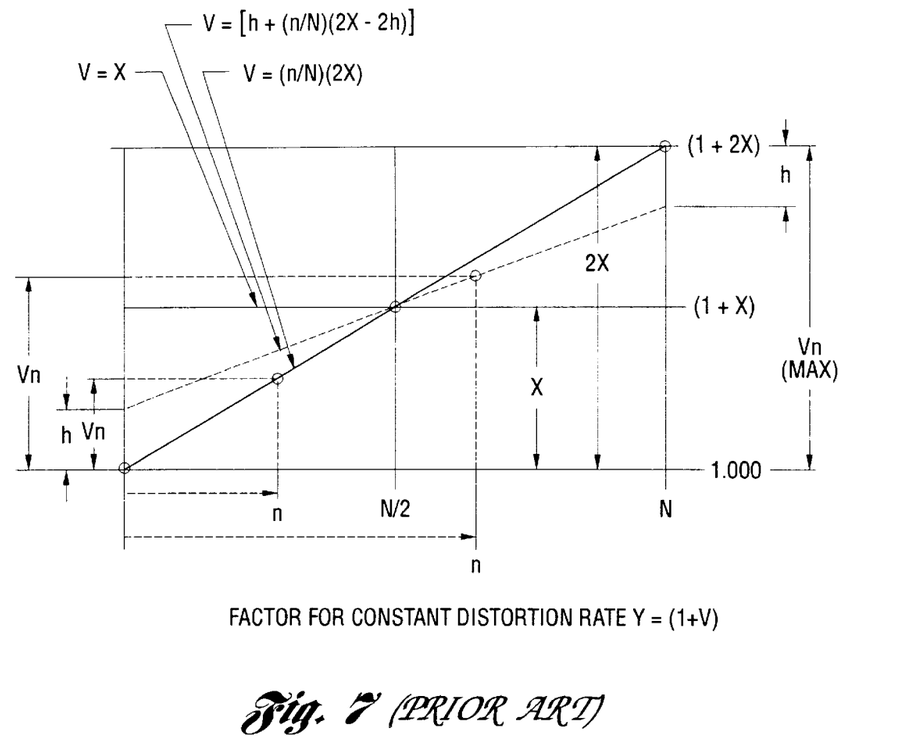
FIG. 7 is a chart from my U.S. Pat. No. 4,449,786 which illustrates typical modifying factors for the secondary viewing area of the mirror.

In FIG. 7, the horizontal line (1+X) illustrates a constant multiplying factor which generates a surface having a constant rate of change for the incremental field angle ($\Delta\delta_n$).

A second preferred mathematical relationship for defining the curvature of the secondary viewing areas generates a constantly changing rate of optical distortion and is illustrated in the following formula:

$$\Delta\delta_n=\{\Delta\delta_{(n-1)}\} \{1+(n/N)(2X)\} \quad (2)$$

The "X" value of this expression is defined the same as that in Formula 1 and is derived in the same manner. In this formula, the (n/N)(2X) factor defines and produces a constantly changing rate of change for the $\Delta\delta_n$ value with respect to each respective field angle increment ($\Delta\delta_{(n-1)}$), thus controlling the optical distortion factor, and is illustrated in FIG. 7 as the diagonal straight line function V={(n/N)(2X)}.

Referring again to FIG. 7, a multiplying factor may be generated to vary between those used in formula (1) and in formula (2), as follows:

$$\Delta\delta_n=(\Delta\delta_{(n-1)})\{1+[h+(n/N)(2X-2h)]\} \quad (3)$$

As previously described, the improvement of the present invention includes the development of a portion of the mirror surface, usually at the periphery (and identified as the tertiary viewing area in the embodiment of FIGS. 1–2), wherein the field angle increment begins decreasing at a constant or increasing rate, thereby providing a decreasing $\Delta\delta_n$ value with respect to each field angle increment ($\Delta\delta_{(n-1)}$), (i.e., a less rapidly decreasing instantaneous radius of curvature) as this surface extends outwardly towards the periphery.

The geometry for this portion of the mirror can be generally represented as:

$$\Delta\delta_n = \{\Delta\delta_{(n-1)}\} \{1-X'\} \quad (4)$$

It should be noted that formula (4) is analogous to formula (1) except that the "X'" value is negative, thereby reducing the incremental field angle $\Delta\delta_n$ relative to the previous field angle increment $\Delta\delta_{(n-1)}$. And, analogous to formula (3), a controlled optical distortion factor which limits the rate at which the field angle increases may be developed by utilizing the multiplying factor as follows:

$$\Delta\delta_n = (\Delta\delta_{(n-1)})\{1-[h'+(n'/N40)(2X'-2h')]\} \quad (5)$$

Figure 8:
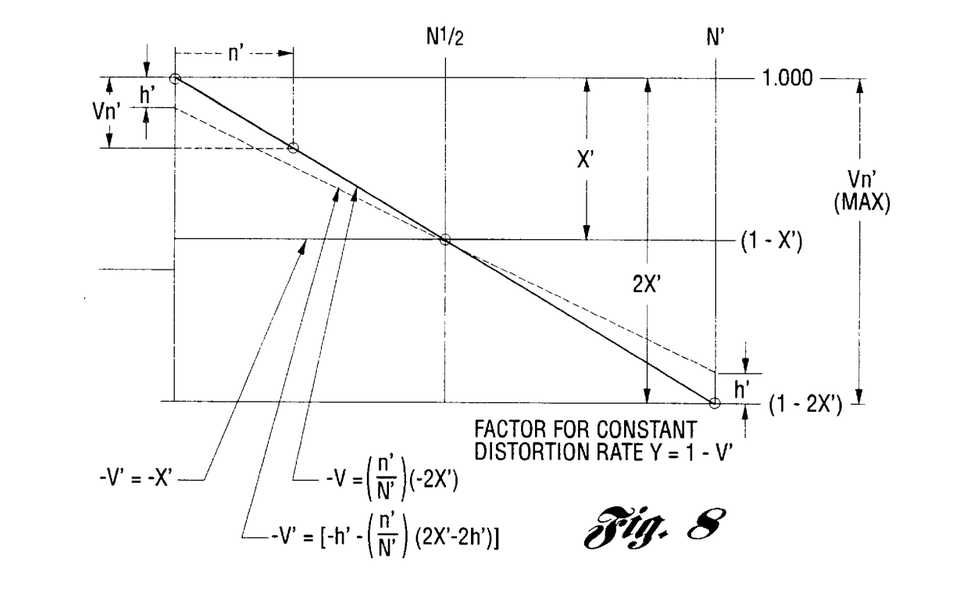
FIG. 8 is a chart which illustrates the typical modifying factors for the tertiary viewing area of the mirror.

Again, as with its counterpart formula (3), formula (5) provides for the development of a surface having a constantly changing rate of change for the $\Delta\delta_n$ value. However, this formula generates a surface on which each subsequent $\Delta\delta_n$ decreases, providing for a reducing rate of change in the field angle, and thus less distortion than would otherwise be obtained by previous mirror design methods. As illustrated in FIG. 8, the different general expressions which may be utilized in formulas (4) and (5) to control the optical distortion as described above, are directly analogous to their counterparts shown in FIG. 7.

It should be noted that each of the factors (X', n', N', h' and V') illustrated in FIG. 8 may be different values from their counterparts (X, n, N, h, and V, shown in FIG. 7).

It should also be noted that, in the embodiment shown in FIGS. 1–5, the curvature of the mirror is revolved about an axis passing through a point S (shown in FIG. 3) at the approximate top left corner of the mirror and slightly beyond the edge of the mirror nearest the observer. The result is a compound curvature having a spherically convex first viewing area, a unique compound aspherically convex secondary viewing area with a radius of curvature which decreases at an increasing rate (and, thus, a viewing angle which increases at an increasing rate), and a unique compound aspherically convex tertiary viewing area with a radius of curvature which decreases (and a viewing angle which increases) at a decreasing rate.

Referring now to FIGS. 5 and 6, the system 70 of the present invention is preferably programmed to develop the surface data based upon initial preselected design parameters, and display the resulting surface coordinates, along with other useful surface design parameters, for review by the operator. If the design surface is satisfactory, the system 70 provides the surface coordinate data in a format useful to drive the control 81 of the machine tool 82 that is to be utilized to machine the mold surface(s).

A. Design Input Variables

In one embodiment of the present invention, operation of the system is initiated by assigning values to the following design input variables:

| Variable | Description |
|---|---|
| $\theta_{A0}$ | 1/2 initial vision angle |
| $C_{A0}$ | Eye distance to mirror |
| $R_{A0}$ | Radius of primary viewing area |
| $x_0$ | Optical centerline to begin iteration |
| $\Delta x_1$ | Initial iterative offset |
| Y | Constant multiplication factor |
| $x_{T00}$ | Mold centerline to optical centerline |
| r | Tool cutter radius |
| Factor flag | Set when "Y" not used |
| $X_B$ | Factor value at $N_2$ divided by 2 (secondary area) |
| $H_B$ | Initial factor value (secondary area) |
| $X_C$ | Factor value at $N_C$ divided by 2 (tertiary area) |
| $H_C$ | Initial factor value (tertiary area) |
| $N_A$ | Total iterations across primary viewing area (constant radius section) |
| $N_B$ | Total iterations across secondary viewing area |
| $N_C$ | Total iterations across tertiary viewing area |
| $N_T$ | Total iterations = ($N_A + N_B + N_C$) |
| T | Thickness of mirror lens |

B. Surface Development

In one embodiment of the present invention, the system develops the mirror surface using the design input variables along with basic geometric principles. For the spherical (constant radius) portions of the mirror, such as the primary surface 16 shown in the embodiment illustrated in FIGS. 1 and 2, the system first determines the initial $\Delta\theta_{A1}$, which represents the change in the viewing angle at $P_{A1}$ from previous point $P_{A0}$. $\Delta x_{A1}$, the initial iterative x offset, as well as the other input variables are known. From these known distances and angles, $\Delta\theta_{A1}$ can be derived using basic geometric relationships. As previously described, for the spherical portion of the mirror surface, each $\Delta\theta$ (incremental field angle) is equal across the entire mirror. Thus, once $\Delta\theta_{A1} = \Delta\theta_1$ is derived, $\theta_n$, $\phi_n$, and, ultimately, $\Delta x$ and $\Delta y$ (i.e. the incremental change in x and y) can be determined for each point $P_n$ on the spherical surface.

The system then generates the aspherical portion (such as either the secondary viewing area, B, or tertiary viewing area, C, of FIGS. 1 and 2) of the mirror in a slightly different fashion. Again, on the basis of the known geometric relationships between the subject angles and distances, each x and y increment may be derived for each subsequent point along the aspherical surface given the known $\Delta\theta_n$ (incremental viewing angle) and $\Delta\delta_n$ (incremental change in the field angle). It should be noted that, as previously described, $\Delta\theta_n$ is a constant increment. The rate of change of the field angle, $\Delta\delta_n$, is derived on the aspherical portion of the mirror (sections B and c) in relationship to a constant vision angle differential formula, such as those of formulas 1, 2, 3, 4 or 5 disclosed herein.

Figure 9:
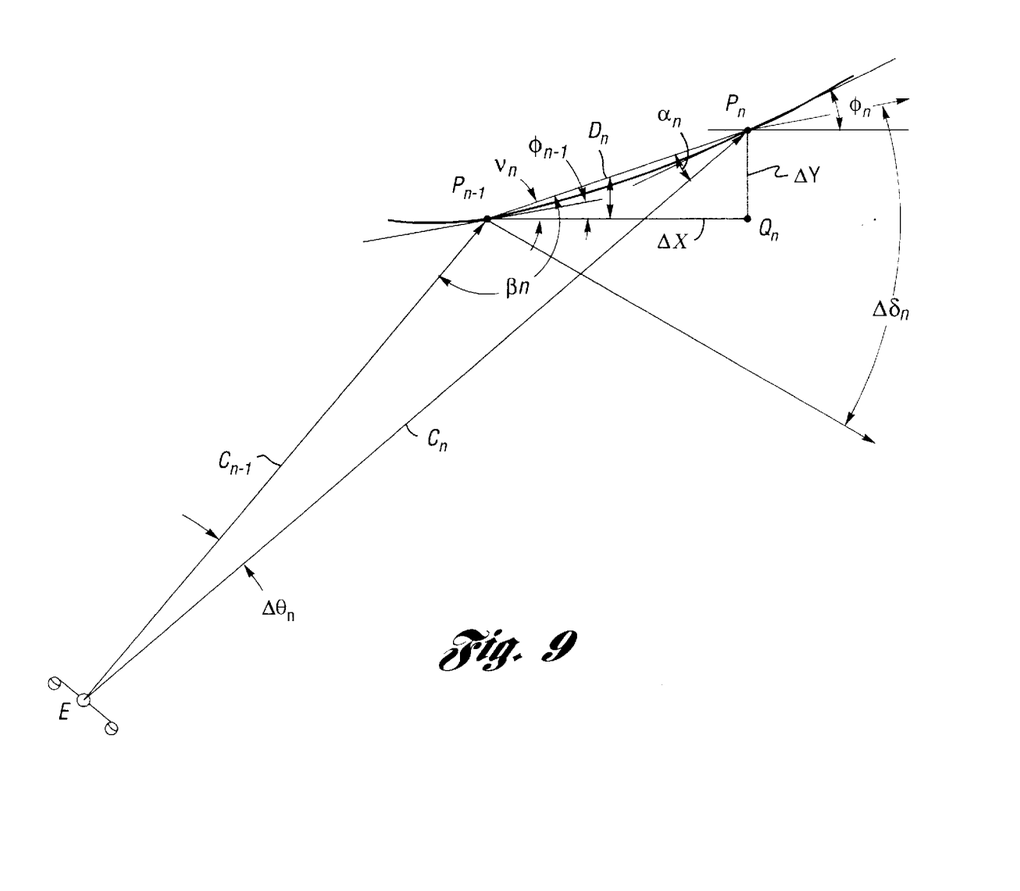
FIG. 9 is a diagram illustrating the geometric relationships between the observer, the mirror, the direction of observation and reflection, field of view, and relevant corresponding distances and angular relationships utilized in developing the $\Delta X$ and $\Delta Y$s for each point along the aspherical portions of the mirror surface.

FIG. 9 is an enlarged view of two points on the aspherical surface (sectors B or C) $P_{n-1}$ and $P_n$, along with other distances and angles that are relevant to the derivation of the $\Delta x$ and $\Delta y$ associated with moving along the surface from $P_{n-1}$ to $P_n$. As previously described, $C_{n-1}$ and $C_n$ are the distances from the viewer to the two points $P_{n-1}$ and $P_n$, respectively. $\Delta\theta_n$ is the incremental viewing angle. The viewing angle, $\theta_n$, is, therefore, equal to $\theta_{n-1} + \Delta\theta_n$. $\phi_n$ is the instantaneous slope of the tangent to the surface at point $P_n$. Likewise, $\phi_{n-1}$ is the instantaneous slope of the tangent to the mirror surface at point $P_{n-1}$. $D_n$ is the cord which subtends the arc from $P_{n-1}$ to $P_n$. It should be noted that $D_n$ is also the hypotenuse of a right triangle which has $\Delta x$ and $\Delta y$ as its legs. $\beta_n$ is the angle $P_n$, $P_{n-1}$, E. $\alpha_n$ is the angle $P_{n-1}$, $P_n$, E.

Given the $\Delta\theta_n$ and $\Delta\delta_n$ for a point $P_n$, the length of the cord, $D_n$, between $P_n$ and $P_{n-1}$ can be derived using basic geometric principles in conjunction with the following assumption.

Referring again to FIGS. 6 and 9, one assumption is made respecting the relationship between $\gamma$ (the slope of the chord between the points ($P_{n-1}$ and $P_n$) and $\phi$, (the slope of the tangent to the surface at point $P_n$):

$$\Delta\gamma_n = \frac{\Delta\phi_n + \Delta\phi_{(n-1)}}{2} \tag{6}$$

$$\Delta\gamma_n = \frac{(\phi_n - \phi_{(n-1)}) + (\phi_{(n-1)} - \phi_{(n-2)})}{2} \tag{7}$$

Therefore, $$\Delta\gamma_n = \frac{\phi_n - \phi_{(n-2)}}{2} \tag{8}$$

This assumption has been found to be a suitable approximation for $\Delta\theta$ for the small angular increments typically encountered in developing these mirror surfaces.

Using the above assumption of Equation 8, $\gamma_n$ can be derived. $\beta_n$, $\alpha_n$ and $C_n$ can then also be derived. Once $C_n$ is derived, $\Delta x$ and $\Delta y$ can be derived as legs of the right triangle formed by points $P_n$, $P_{n-1}$ and $Q_n$ (the point defined by the intersection of a line parallel to the x axis at $P_{(n-1)}$ and the line parallel to the y axis at $P_n$).

$\Delta\delta$ is thereafter incremented according to the chosen multiplying factor and each point along the aspherical surface is thereby generated.

It should be noted that, while the procedure for generating the incremental x and y for the tertiary viewing area is identical to that for the secondary viewing area, and for that matter, for any aspherical viewing area, the iterations for each different viewing area will vary by the specific multiplying factor which controls the rate of change of the viewing angle for that viewing area.

C. Output Variables

After the system completes development of the entire design surface (i.e. $N_T$ iterations), the system may be programmed to print a display of selected output variables for review by the designer, or if the surface is deemed acceptable, for conversion and/or input to a CAD system to graphically display the surface, or to a machine tool to machine a mold surface for the mirror. In one embodiment of the system, the resulting values of the following output variables for each of the $N_T$ iterations may be displayed:

| Variable | Description |
| --- | --- |
| $P_n$ | Point n |
| $\theta_n$ | Vision angle to point n |
| $\delta_n$ | Field angle at point n |
| $\Delta\delta_n$ | Incremental field angle from point n-1 to point n |
| $ROC_n$ | Radius of curvature at point n |
| Slope ($\gamma_n$) | Slope of chord between points n-1, n |
| $MAG_n$ | Magnification factor at point n |
| $DMAG_n$ | Change in magnification factor from point n-1 to point n |
| $DDMAG_n$ | Change in DMAG from point n-1 to point n |
| $x_n$ | x coordinate of point n |
| $y_n$ | y coordinate at point n |
| $PHI_n$ ($\phi_n$) | Instantaneous slope of the tangent to surface at point n |

It will be appreciated by those skilled in the art that the above variables may be reviewed by the designer to determine whether the resulting surface is acceptable. If not, any of the input variables might be changed and the program run again to develop another surface. Any of $N_A$, $N_B$, or $N_C$ might be modified in a subsequent run to develop the total surface, as well as primary, secondary, or tertiary viewing areas in different proportions to the total surface to obtain a different total field angle and/or improved image size and controlled distortion at selected points across the surface of the mirror.

Similarly, X and/or h might also be varied to modify the multiplying factor which governs the rate of change in the field angle for the secondary viewing area. Likewise, X' and h' may be modified to control the rate of change of the field angle in the tertiary viewing area.

Once a desirable surface is developed, the system may be programmed to print the X and Y coordinates for the surface for subsequent input to a machine control to machine the mirror mold surface. It should be noted that conventional coordinate transformation techniques may be employed to suitably offset the X and Y coordinates to generate surface coordinates for a male mold or a female mold, given the tool cutter radius and the thickness of the mirror lens.

In an alternative contemplated embodiment, the final surface coordinate data for the male and female molds is converted by the system to a suitable format for the machine tool control 81 and stored on machine readable media in a format suitable for acquisition by the machine tool control 81.

In another contemplated embodiment, the system may utilize conventional conversion techniques to convert the X, Y surface coordinate data into a suitable format and then be transmitted via conventional network linked directly to the machine tool control 81.

Again, while the embodiment of FIGS. 1–5 includes three viewing areas, the method of the present invention can be implemented to create mirrors having any number of viewing areas greater than one, wherein one of the viewing areas is defined as a surface wherein the field angle is increasing at a decreasing rate. For example, a passenger side view mirror might be developed which employs a primary viewing area having an aspherical convex surface wherein the field angle increases at a constant rate (as described by equation (1), (2) or (3)), and a secondary viewing surface wherein the field angle is increasing at a decreasing rate (as described by equations (4) or (5)).

The improvement of the present invention may similarly be employed in any multi-zone mirror including the many embodiments discussed in my previous U.S. Pat. No. 4,449,786, by incorporating a viewing area, typically along all or some portion of the periphery of the mirror, which is defined by a surface wherein the field angle is increasing at a decreasing rate.

It should also be appreciated that, although a viewing area of the type shown as tertiary viewing area 20 is typically utilized at the periphery of the mirror, typically contiguous to the reducing radius-of-curvature secondary viewing area, there are some applications for which this type of surface may be employed at other locations on the mirror surface; or may depend from a central or edge located spherical convex surface such as the primary viewing surface of this embodiment. For example, a mirror(s) mounted on the front, passenger-side or driver-side fender of a bus, may require a viewing surface which expands the field of view on the forward side(s) of the mirror(s) (to allow the driver to view the street immediately in front of the bus) and on the rearward side(s) of the mirror(s) (to allow the driver to view the street near the front wheels of the bus) while limiting the field of view in the center of the mirror (to limit the reflected image size of the bus fender itself). In such an application, a reduced spherical radius-of-curvature may be used in the central portion of the mirror to limit the apparent image size in that portion of the mirror which merely reflects the close-up image of the bus's fender. Surfaces employing formulas (4) or (5), as used in the tertiary viewing area 20 may then be employed, which will develop field angles that are decreasing at either constant or increasing rates, thus enhancing the image size and discernment of objects in the side areas.

Thus, the improvement of the present invention provides a mirror having controlled image distortion as the observer views an object moving across the mirror such that his eyes comfortably adjust as the image travels through the transitions between the different viewing areas on the mirror. My improved method and resulting mirror is also easier to manufacture using conventional glass forming equipment and methods.

While the best mode for carrying out the invention has been described in detail, those familiar with the art to which this invention relates will recognize various alternative designs and embodiments for practicing the invention as disclosed by the following claims.

What is claimed is:

1. A vehicle mirror for mounting on a vehicle in a selected position relative to an observation point within the vehicle, the mirror having a viewing surface including a portion having a curvature expressed substantially in accordance with the following incremental field angular relationships:

$$\Delta\delta_n = (\Delta\delta_{(n-1)})\{1-[h'+(n'/N')(2X'-2h')]\}$$

in which n defines a selected point along a substantially radial line extending from a selected focal design starting point on the mirror's surface, (n-1) defines the point immediately preceding n, $\delta_n$ defines the accumulated field angle from the starting point for the surface to n, $\Delta\delta_n$ defines the incremental field angle between n and (n-1), n' defines a selected point along the radial line in the portion, N' represents the total iterations across the portion, X' represent a constant factor controlling optical development across the portion, chosen to produce a desired total field of view across the surface, h' is a factor having a value between zero and 2X', chosen to control optical distortion across the portion.

2. The mirror of claim 1 wherein the viewing surface further includes a generally flat primary viewing surface, a generally aspherical convex secondary viewing surface adjacent the primary viewing surface having a border merging substantially tangentially into the primary viewing surface and extending generally outwardly from the focal design starting point, wherein the field angle increases at an increasing rate, and wherein the portion defines a generally aspherical convex tertiary viewing surface adjacent the secondary viewing surface, having a border merging substantially tangentially into the secondary viewing surface and extending generally outwardly from the focal design starting point, wherein the field angle increases at a decreasing rate as the tertiary viewing surface extends outwardly from the focal design starting point toward the edge of the mirror.

3. The mirror of claim 1 wherein the viewing surface further includes a generally spherical convex primary viewing surface, and wherein the portion defines a generally aspherical convex secondary viewing surface adjacent the primary viewing surface having a border merging substantially tangentially into the primary viewing surface and extending generally outwardly from the focal design starting point, wherein the field angle increases across the secondary viewing surface at a decreasing rate as the secondary viewing surface extends outwardly from the focal design starting point toward the edge of the mirror.

4. A vehicle mirror for mounting on a vehicle in a selected position relative to an observation point within the vehicle, the mirror having a viewing surface including a generally spherical convex primary viewing surface, a generally aspherical convex secondary viewing surface adjacent the primary viewing surface having a border merging substantially tangentially into the primary viewing surface and extending generally outwardly from a selected optical design starting point, wherein the field angle increases across the secondary viewing surface at an increasing rate, and a generally aspherical convex tertiary viewing surface adjacent the secondary viewing surface having a border merging substantially tangentially into the secondary viewing surface and extending generally outwardly from the optical design starting point, wherein the field angle increases across the tertiary viewing surface at a decreasing rate as the tertiary viewing surface extends outwardly from the optical design starting point toward the edge of the mirror, the tertiary surface having a curvature expressed substantially in accordance with the following incremental field angular relationships:

$$\Delta\delta_n = (\Delta\delta_{(n-1)})\{1-[h'+(n'/N')(2X'-2h')]\}$$

in which n defines a selected point alone a substantially radial line extending from a selected optical design starting point on the mirror's surface, (n-1) defines the point immediately preceding n, $\delta_n$ defines the accumulated field angle from the starting point for the surface to n, $\Delta\delta_n$ defines the incremental field anile between n and (n-1), n' defines a selected point along the radial line in the portion, N' represents the total iterations across the portion, X' represent a constant factor controlling optical development across the portion, chosen to produce a desired total field of view across the surface, h' is a factor having a value between zero and 2X', chosen to control optical distortion across the portion.

5. A vehicle mirror for mounting on a vehicle in a selected position relative to an observation point within the vehicle, the mirror having a viewing surface comprising:

a first portion of the viewing surface having a curvature expressed substantially in accordance with the following incremental field angular relationships:

$$\Delta\delta_n = (\Delta\delta_{(n-1)})\{1+[h+(n/N)(2X-2H)]\}$$

in which n defines a selected point along a substantially radial line extending from a selected optical design starting point on the mirror's surface, (n-1) defines the point immediately preceding n; $\delta_n$ defines the accumulated field angle from the optical design starting point to n; $\Delta\delta_n$ defines the incremental field angle between n and (n-1); N represents the total iterations across the first portion of the surface; X represents a constant factor controlling optical development across the first portion of the surface, chosen to produce a desired total field of view across the first portion, h is a factor having a value between zero and 2X, chosen to control optical distortion across the first portion; and a second portion, adjacent the first portion of the viewing surface, the second portion having a curvature expressed substantially in accordance with the following incremental field angular relationships:

$$\Delta\delta_n = (\Delta\delta_{(n-1)})\{1-[h'+(n'/N')(2X'-2h')]\}$$

in which, for the second portion of the surface, n' represents a selected point along the radial line in the second portion, N' represent the total iterations across the second portion of the surface, X' represents a constant factor controlling optical development across the second portion of the surface, chosen to produce a desired total field of view across the second portion of the surface, and h' is a factor having a value between zero and 2X', chosen to control optical distortion across the second portion.

6. The vehicle mirror of claim 5 wherein the viewing surface includes another portion having a generally spherical convex surface, and wherein the first portion is adjacent the spherical convex portion, having a border merging substantially tangentially into the spherical convex portion and extending generally outwardly from the optical design starting point.

7. The vehicle mirror of claim 5 wherein the viewing surface includes another portion having a generally flat surface, and wherein the first portion is adjacent the flat portion, having a border merging substantially tangentially into the flat portion and extending generally outwardly from the focal design starting point.

8. A mold for forming a vehicle mirror for mounting on a vehicle in a selected position relative to an observation point within the vehicle, the mold having a surface including a portion having a curvature expressed substantially in accordance with the following incremental reflection angular relationships:

$$\Delta\delta_n = (\Delta\delta_{(n-1)})\{1-[h'+(n'/N')(2X'-2h')]\}$$

in which n defines a selected point along a substantially radial line extending from a selected focal design starting point on the mold's surface, (n-1) defines the point immediately preceding n, $\delta_n$ defines the accumulated reflection angle from the starting point for the surface to n, $\Delta\delta_n$ defines the incremental reflection angle between n and (n-1), $\phi_n$ is the slope angle of the surface at n, with respect to the surface at the selected starting point, n' defines a selected point along the radial line in the portion, N' represents the total iterations across the portion, X' represent a basic constant factor controlling the $\phi_n$ slope angle development in the mold at any point across the portion, chosen to produce a desired total $\phi_N$ slope angle across the mold's surface, h' is a factor having a value between zero and 2X', chosen to control progression of $\phi_n$ in the mold across the portion.

9. The mold of claim 8 wherein the mold surface further includes a generally flat primary surface, a generally aspherical convex secondary surface adjacent the primary surface having a border merging substantially tangentially into the primary surface and extending generally outwardly from the focal design starting point, wherein the reflection angle increases at an increasing rate, and wherein the portion defines a generally aspherical convex tertiary surface adjacent the secondary surface, having a border merging substantially tangentially into the secondary surface and extending generally outwardly from the focal design starting point, wherein the reflection angle increases at a decreasing rate as the tertiary surface extends outwardly from the focal design starting point toward the edge of the mold.

10. A mold for forming a vehicle mirror for mounting on a vehicle in a selected position relative to an observation point within the vehicle, the mold including a generally spherical convex primary surface, a generally aspherical convex secondary surface adjacent the primary surface having a border merging substantially tangentially into the primary surface and extending generally outwardly from a selected optical design starting point, wherein the reflection angle increases across the secondary surface at an increasing rate, and a generally aspherical convex tertiary surface adjacent the secondary surface having a border merging substantially tangentially into the secondary surface and extending generally outwardly from the optical design starting point, wherein the reflection angle increases across the tertiary surface at a decreasing rate as the tertiary surface extends outwardly from the optical design starting point toward the edge of the mold having a curvature expressed substantially in accordance with the following incremental reflection angular relationships:

$$\Delta\delta_n = (\Delta\delta_{(n-1)})\{1-[h'+(n'/N')(2X'-2h')]\}$$

in which n defines a selected point along a substantially radial line extending from a selected optical design starting point on the mold's surface, (n-1) defines the point immediately preceding n, $\delta_n$ defines the accumulated reflection angle from the starting point for the surface to n, $\Delta\delta_n$ defines the incremental reflection angle between n and (n-1), $\phi_n$ is the slope angle of the surface at n, with respect to the surface at the selected starting point, n' defines a selected point along the radial line in the portion, N' represents the total iterations across the portion, X' represent a basic constant factor controlling the $\phi_n$ slope anile development in the mold at any point across the portion, chosen to produce a desired total $\phi_N$ slope angle across the mold's surface, h' is a factor having a value between zero and 2X', chosen to control progression of $\phi_n$ in the mold across the portion.

11. A mold for forming a vehicle mirror for mounting on a vehicle in a selected position relative to an observation point within the vehicle, the mold having a surface comprising:

a first portion of the surface having a curvature expressed substantially in accordance with the following incremental reflection angular relationships:

$$\Delta\delta_n(\Delta\delta_{(n-1)})\{1+[h+(n/N)(2X-2h)]\}$$

in which n defines a selected point along a substantially radial line extending from a selected optical design point on the mold's surface, (n-1) defines the point immediately preceding n; $\delta_n$ defines the accumulated reflection angle from the optical design starting point to n; $\Delta\delta_n$ defines the incremental reflection angle between n and (n-1); $\phi_n$ is the slope angle of the surface at n, with respect to the surface at the selected starting point N represents the total iterations across the first portion of the surface; X represents a basic constant factor controlling the $\phi_n$ slope angle development in the mold at any point across the first portion of the surface, chosen to produce a desired total $\phi_N$ slope angle in the mold across the first portion, h is a factor having a value between zero and 2X, chosen to control optical distortion in the mold across the first portion; and a second portion, adjacent the first portion of the surface, the second portion having a curvature expressed substantially in accordance with the following incremental reflection angular relationships:

$$\Delta\delta_n = (\Delta\delta_{(n-1)})\{1-[h'+(n'/N')(2X'-2h')]\}$$

in which, for the second portion of the surface, n' represents a selected point along the radial line in the second portion, N' represent the total iterations across the second portion of the surface, X' represents a basic constant factor controlling the $\phi_n$ slope angle development in the mold at any point across the second portion of the surface, chosen to produce a desired total $\phi_N$ slope angle in the mold across the second portion of the surface, and h' is a factor having a value between zero and 2X', chosen to control progression of $\phi_n$ in the mold across the second portion.

12. The mold of claim 11 wherein the surface includes another portion having a generally spherical convex surface, and wherein the first portion is adjacent the spherical convex portion, having a border merging substantially tangentially into the spherical convex portion and extending generally outwardly from the optical design starting point.

13. The mold of claim 11 wherein the surface includes another portion having a generally flat surface, and wherein the first portion is adjacent the flat portion, having a border merging substantially tangentially into the flat portion and extending generally outwardly from the focal design starting point.

* * * * *

UNITED STATES PATENT AND TRADEMARK OFFICE
CERTIFICATE OF CORRECTION

PATENT NO. : 5,980,050
DATED : November 9, 1999
INVENTOR(S) : McCord

It is certified that error appears in the above-identified patent and that said Letters Patent is hereby corrected as shown below:

<u>In the Drawing</u>:

Delete Drawing Sheet 6, and substitute therefor the Drawing Sheet, consisting of Fig. 7-8, as shown on the attached page.

Column 3, line 33, view of the mold of Figure "2" should read -- 3 --.

Column 7, line 11, are points on the "secondary" should read -- tertiary --.

Column 9, line 5, field angle increment begins "decreasing" should read -- increasing --; delete "constant"

Column 9, line 6, "or increasing" should read --decreasing-- rate, thereby providing "a decreasing" should read -- an increasing --

Signed and Sealed this

Eighth Day of February, 2000

*Attest:*

Q. TODD DICKINSON

*Attesting Officer*   *Commissioner of Patents and Trademarks*

FACTOR FOR CONSTANT DISTORTION RATE: $Y = (1+V)$

Fig. 7 (PRIOR ART)

FACTOR FOR CONSTANT DISTORTION RATE: $Y' = (1+V')$

Fig. 8